United States Patent [19]

Miyazaki

[11] Patent Number: 5,340,373

[45] Date of Patent: Aug. 23, 1994

[54] METHOD FOR PRODUCING OPTICAL ELEMENT BY PRESS MOLDING A BLANK HAVING A COMPONENT REMOVED LAYER AND A HYDROCARBON COATING

[75] Inventor: Sunao Miyazaki, Kawasaki, Japan

[73] Assignee: Canon Kabushiki Kaisha, Tokyo, Japan

[21] Appl. No.: 14,224

[22] Filed: Feb. 5, 1993

[30] Foreign Application Priority Data

Feb. 18, 1992 [JP] Japan ................................. 4-60960

[51] Int. Cl.⁵ .................................................. C03B 23/00
[52] U.S. Cl. ......................................... 65/24; 65/102; 65/60.3; 65/111
[58] Field of Search ................. 65/60.3, 102, 111, 24, 65/23, 35

[56] References Cited

U.S. PATENT DOCUMENTS

| 3,275,470 | 9/1966 | Charles | 65/111 |
| 3,420,693 | 7/1969 | Scholes | 65/24 |
| 4,086,074 | 4/1978 | Minot | 65/111 |
| 4,102,664 | 7/1978 | Dumbaugh | 65/23 |
| 4,806,137 | 2/1989 | Virey | 65/24 |

Primary Examiner—Peter Chin
Assistant Examiner—John M. Hoffmann
Attorney, Agent, or Firm—Fitzpatrick, Cella, Harper & Scinto

[57] ABSTRACT

This invention is to prevent coloring or clouding of the molded article, and also to prevent fusion between the glass blank and the mold member and crack formation in the molded article.

The glass blank is provided with the surface layer containing a lower content in water-soluble components than in the core part of the glass base, and a hydrocarbon coating layer formed on the layer. The blank is then press molded.

2 Claims, 3 Drawing Sheets

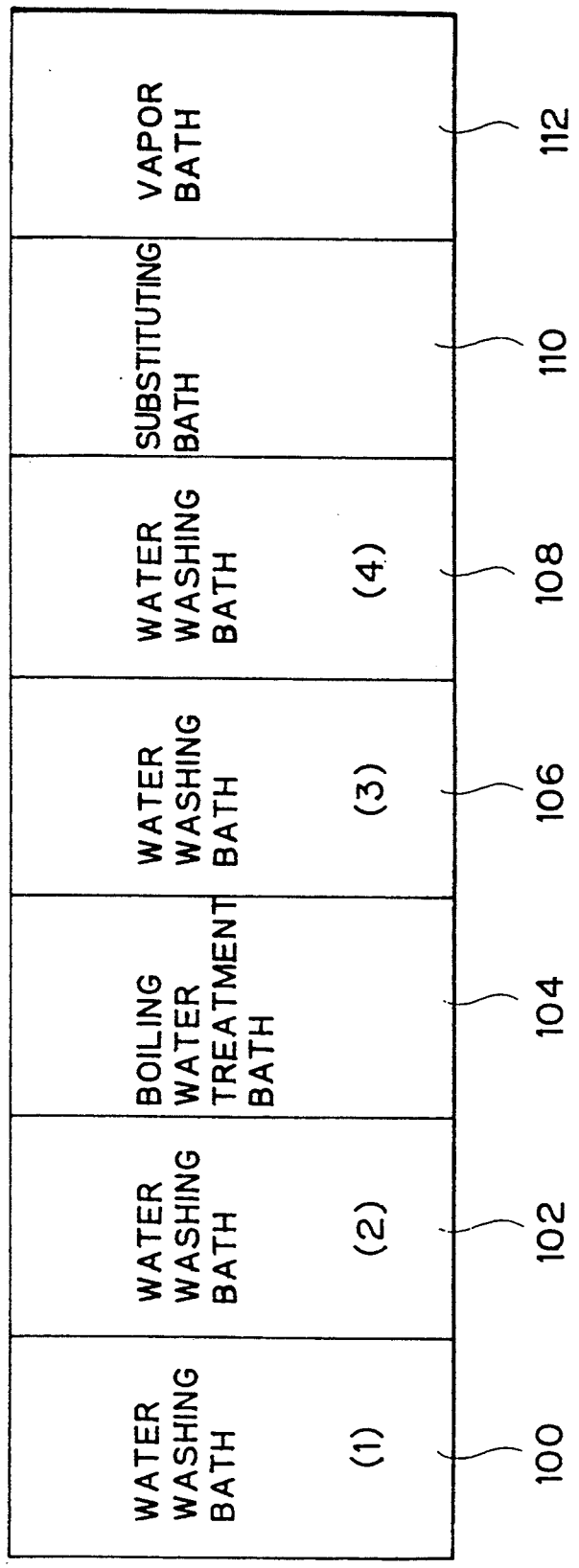

METHOD FOR PRODUCING OPTICAL ELEMENT BY PRESS MOLDING A BLANK HAVING A COMPONENT REMOVED LAYER AND A HYDROCARBON COATING

BACKGROUND OF THE INVENTION

1. Field of the Invention

The present invention relates to a glass blank employed as a molding material in the press molding of an optical element such as a lens, and more particularly to a glass blank capable of preventing a reaction with the mold member upon press molding, also reducing the adhesive force and the frictional force, thereby avoiding fusion and crack formation in the course of cooling and obtaining a satisfactory optical element, and also to a method for producing an optical element utilizing the glass blank.

2. Related Background Art

For obtaining a satisfactory molded product from the reheating and pressing of glass, it has been a major problem to avoid fusion between the molding glass and the mold member. For this purpose there have been proposed various technologies in the improvement of the mold member, and improvements in the molding material are recently starting to be proposed for preventing the type of fusion mentioned above. Among such proposals for the improvement of the molding material, Japanese Patent Publication Nos. 2-1778, 2-1779, 2-1780 and 61-29890 disclose providing the surface of a glass base with a coating of glass having a higher glass transition point than that of the glass base, a coating of silicon oxide or of carbon. Also, Japanese Patent Laid-open Application No. 1-264937 discloses providing the surface of a glass base with a thin organic layer. Also, the Japanese Patent Laid-open Application No. 62-207728 discloses removing evaporable components on the surface with an acid.

These improvements are effective for avoiding fusion of the glass to the mold member, but the methods disclosed in the above-mentioned references are associated with the following drawbacks:

(a) When the surface of the glass base is provided with a coating of glass having a higher glass transition point than that of the glass base, the glass coating layer is cracked by the molding pressure, and the glass base oozes through the crack causing local clouding on the surface or local fusion of the glass base to the mold member. Also, the adhesive force and the frictional force between the glass blank and the mold member may become large in the course of cooling, eventually causing a crack in the glass base;

(b) When the surface of the glass base is given a coating of silicon oxide, there will be encountered difficulties similar to those in case (a). Particularly, cracks easily occur in the course of cooling, because silicon oxide strongly stickes to with the mold member. The coating tends to crack in the heating stage, because the thermal expansion coefficient of silicon oxide is significantly lower than that of the ordinary optical glass constituting the glass base;

(c) If the surface of the glass base is given an unnecessarily thick carbon coating, the carbon, being a reducing agent, reacts with oxygen in the glass, thus reducing the glass components and giving a brown color thereto. Particularly, if lead-containing glass is used as a glass base, PbO therein is reduced, so that the glass is colored conspicuously and has a lowered transmittance;

(d) When the surface of the glass base is given a thin organic layer, the layer is decomposed upon heating, eventually generating a corrosive gas (such as chlorine or fluorine), thereby contaminating the press molding apparatus and affecting the life of the apparatus including the mold member. Also, the surface precision of the molding apparatus may be deteriorated because the decomposition occurs locally at random;

(e) In some optical glasses, when immersed in acid, not only the volatile components but also the glass itself are dissolved, thus the acid treatment is not usable in such a case.

For avoiding these drawbacks, Japanese Patent Application No. 2-187148 proposes a glass blank having a hydrocarbon coating on glass. According to this proposal, the hydrocarbon coating contains a larger amount of $CH_2$ in comparison with the carbon coating of a same thickness, thereby being superior in preventing fusion and crack formation, without excessive deterioration of the transmittance of the glass blank.

However, this proposal is still associated with a drawback in that the molded article becomes clouded, though slightly, by the reaction of easily-reactive components in the glass blank, particularly alkali metal oxides and boric, acid, with the hydrocarbon coating.

SUMMARY OF THE INVENTION

The object of the present invention is to prevent a reaction between the glass blank and the mold member, thereby principally avoiding a coloring and clouding of the molded article, also avoiding fusion between the molded article and the mold member, and avoiding any crack formation and coloring.

The above-mentioned object can be attained, according to the present invention, by a glass blank adapted for use as a molding material in the manufacturing an optical element by press molding, wherein the glass blank has, a glass base, a layer provided on the glass base and containing a lower content of water-soluble components than a core part of the glass base, and a hydrocarbon coating layer provided on the layer. Also, there is provided a method for producing an optical element, employing the glass blank.

BRIEF DESCRIPTION OF THE DRAWINGS

FIG. 4 is a schematic view showing the configuration of boiling water tanks employed for the formation of a layer from which the water-soluble components are removed.

DESCRIPTION OF THE PREFERRED EMBODIMENTS

Figure 1:
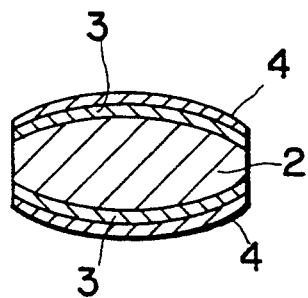
FIG. 1 is a cross-sectional view of an embodiment of the glass blank of the present invention.

Now, the present invention will be explained in detail by the embodiment thereof.

The glass base to be employed in the present invention may be any glass that is usually employed in press molding and that contains water-soluble components such as alkali or boric acid. Examples of such glass include flint glass (SF, F), crown glass (SK, BK), lanthanum flint glass (LaSF, LaF) and lanthanum crown glass (LaK). The glass base is preferably ground and polished to a shape close to the desired form of a molded optical element. It may be otherwise formed as a ball lens or a precision gob (blank for pressing, formed without grinding or polishing).

After the mechanical working mentioned above, a layer in which the water-soluble components are decreased (hereinafter called water-soluble component-removed layer) is formed on the surface of the glass base.

In the present invention, the water-soluble component-removed layer and a hydrocarbon coating layer are required in order to obtain the following advantages. Since the water-soluble component-removed layer present on the glass base surface does not prevent fusion between the mold and the molded article or cracking in the molded article, there is separately required a layer (i.e., the hydrocarbon coating layer in the present invention) for lowering the adhesive force between the mold and the molded article. The hydrocarbon coating layer should preferably be as thin as possible in order to prevent contamination of the mold or coloring of the molded article and to improve the precision of the transferring of the surface pattern. But, the hydrocarbon coating layer alone is insufficient to prevent clouding on the glass surface. Accordingly, in the present invention, the combination of the above with the water-soluble component-removed layer causes a thinner film layer to be realized.

The thickness of the water-soluble component-removed layer is preferably within a range from 100 to 1000 Å, because a thickness less than 100 Å results in a reaction between the molded article and the hydrocarbon coating layer upon molding, thereby giving a color to the molded article, and also leading to mold contamination, cracking of the molded article and fusion between the mold and the molded article. On the other hand, a thickness in excess of 1000 Å results in fissures on the surface of the molded article.

The water-soluble component-removed layer can be formed in the following manner. A glass blank is set on a washing jig, and is then subjected to a surface cleaning by ultrasonic washing. The glass blank is then immersed continuously in a bath of boiling water, of which the temperature is preferably within a range from 95° to 100° C. in order to obtain a layer having a uniform thickness within a short time. There may be employed a water temperature out of the range, though the processing time becomes longer. After the immersion in boiling water, the blank is repeatedly washed with water to eliminate the water-soluble components remaining on the blank, then the water is replaced with alcohol, thereafter, the blank is dried in a solvent vapor bath before proceeding to the formation of the hydrocarbon coating layer.

The hydrocarbon coating layer forms a layer of a very small amount of reaction gas at the interface between the mold member and the glass blank, thereby lowering the adhesive force therebetween, and preventing fusion and crack formation. For this purpose, the thickness of the hydrocarbon coating layer is preferably within a range of from 5 to 50 Å, more preferably from 5 to 20 Å. An excessively small thickness cannot provide a sufficient effect for lowering the adhesive force. An excessively large thickness gives rise not only to marked coloring in the molded article, which lowers the transmittance, but also to a deteriorated precision of surface transference. For this reason, if the thickness is too large, it becomes necessary to eliminate the components of the hydrocarbon coating layer and the reaction product of the hydrocarbon coating layer and the glass which are remaining on the glass blank surface after molding, by a post process such as annealing.

The hydrocarbon coating layer contains a larger amount of $CH_2$ than a carbon coating layer having the same thickness, therefore, the coating layer has a sufficient effect, even with a very small thickness (5 to 50 Å), for preventing fusion and crack formation without a significant loss in the transmittance of the glass blank.

The hydrocarbon coating layer can be formed with a method having good throwing power relative to the glass blank, such as a high-frequency discharge treatment, an ion gun treatment or a DC discharge treatment of hydrocarbon gas. These methods also provide the advantage of low cost.

In the following there, will be explained embodiments of the present invention with reference to the attached drawings.

FIG. 1 is a cross-sectional view of an embodiment of the glass blank of the present invention, wherein the optical element is a biconvex lens.

In FIG. 1, a glass base 2, serving as the material for press molding, is composed of optical glass having a refractive index and a dispersion value, required for obtaining a lens having desired optical characteristics. The glass base 2 is finished to a form having a dimension that is close to the desired lens form. The surfaces of the glass base 2, for constituting the optically functional faces, are provided with a water-soluble component-removed layer 3 and a hydrocarbon coating layer 4 in this order.

The water-soluble component-removed layer 3 can be formed, for example, by treatment with water of 100° C., and preferably has a thickness within a range from 100 to 1000 Å.

The thickness of the hydrocarbon coating layer 4 is preferably within a range from 5 to 50 Å, more preferably from 5 to 20 Å. An excessively small thickness cannot sufficiently lower the adhesive force between the mold and the glass blank, while an excessively large thickness results in a significant loss in the transmittance of the molded article, thus necessitating an annealing process. The hydrocarbon coating layer 4 can be formed with simple thin film depositing technology, such as a plasma treatment or an ion gun treatment. The atomic ratio of carbon:hydrogen in the hydrocarbon coating layer 4 is, for example, from 10/6 to 10/0.5, and preferably within a range from 10/5 to 10/1.

Figure 2:
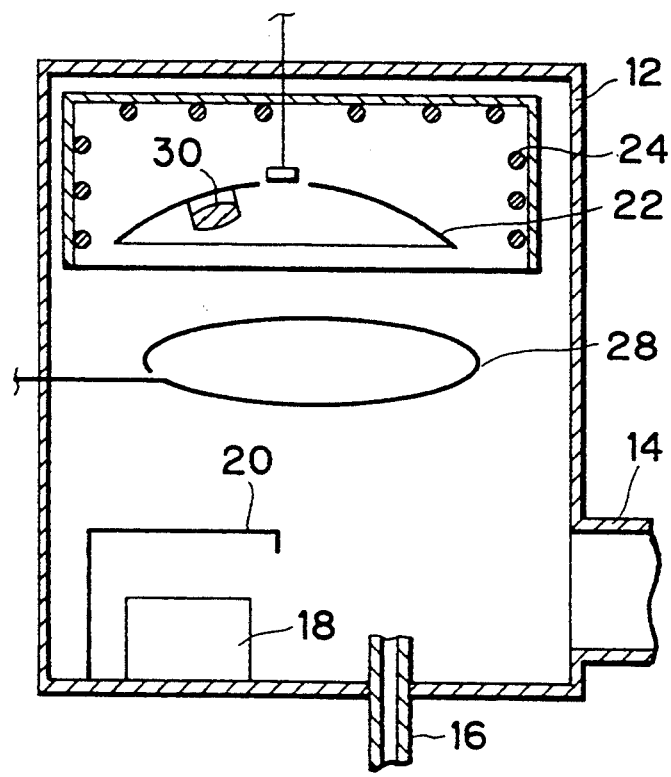
FIG. 2 is a schematic view showing the configuration of a thin film depositing apparatus adapted for use in the preparation of the glass blank of the above-mentioned embodiment.

FIG. 2 is a schematic view of a thin film deposition apparatus, adapted for use in manufacturing the glass blank of the above-mentioned embodiment. In the following discussion, there will be explained an example of blank preparation with reference to FIG. 2.

In FIG. 2, there are shown a vacuum chamber 12; an exhaust outlet 14 formed therein and connected to a vacuum pump (not shown); and a gas inlet 16 for introducing gas into the vacuum chamber 12, the inlet 16 being connected to a gas source (not shown). In the lower part of the vacuum chamber 12, there are provided an evaporation source 18 and a shutter 20. In the upper part, a dome-shaped holder 22 for supporting a glass base, a heater 24 for heating a glass base, and a crystal film thickness monitor 26 for measuring the coating thickness. There are also shown an antennae 28 for high frequency application, and a glass base 30 supported by said holder 22.

Upon depositon of the hydrocarbon coating layer 4 on the surface of the glass base 30 (2), the interior of the vacuum chamber 12 is evacuated from the exhaust outlet 14, then hydrocarbon gas is introduced from the gas inlet 16 up to a pressure, for example, of $5\times10^{-2}$ to $5\times10^{-4}$ Torr, and a high frequency power of 100 to 500 W is applied to the antennae 28 for generating hydrocarbon plasma. Examples of hydrocarbon gas to be introduced into the vacuum chamber 12 include methane, ethane, propane, ethylene, propylene and acetylene. The atomic ratio of carbon:hydrogen in the hydrocarbon coating layer 4 varies depending upon the conditions of deposition, so that the conditions are so selected as to obtain a desired atomic ratio.

In the following there will be explained an example of producing the glass blank as mentioned above, by employing the above-explained apparatus.

A glass base 30, obtained by polishing lanthanum crown optical glass (VC78 produced by Sumita Kogaku Co., $n_d=1.66910$, $\nu_d=55.4$) was set on a jig for boiling water treatment, then washed in a water-washing bath (1) 100 and a water-washing bath (2) 102 shown in FIG. 4, then treated in a boiling water bath 104 for 5 minutes to obtain a processed layer of about 400 Å, further washed in a water-washing bath (3) 106 and a water-washing bath (4) 108, subjected to the substituting of water in an alcohol substituting bath 110 and dried in a triethane vapor bath 112. Subsequently, the glass base 30 was set on the holder 22. After it was heated to 300° C. by the heater 24, the interior of the vacuum chamber 12 was evacuated from the exhaust outlet 14 until a pressure of $1\times10^{-5}$ Torr or lower and Ar gas was introduced from the gas inlet 16 to a pressure of $4\times10^{-4}$ Torr. Then, a high frequency power of 300 W was applied to the antennae 28 to perform high frequency discharging, thereby effecting a plasma cleaning of the glass base 30. Subsequently, CH$_4$ gas was introduced from the gas inlet 16 to a pressure of $1\times10^{-3}$ Torr, and a high frequency power of 400 W was applied to the antennae 28 to perform high frequency discharging, thereby forming a hydrocarbon coating layer of about 30 Å in thickness. The atomic ratio of carbon:hydrogen in the hydrocarbon coating layer 4 was about 10/2 according to infrared spectral analysis.

Figure 3:
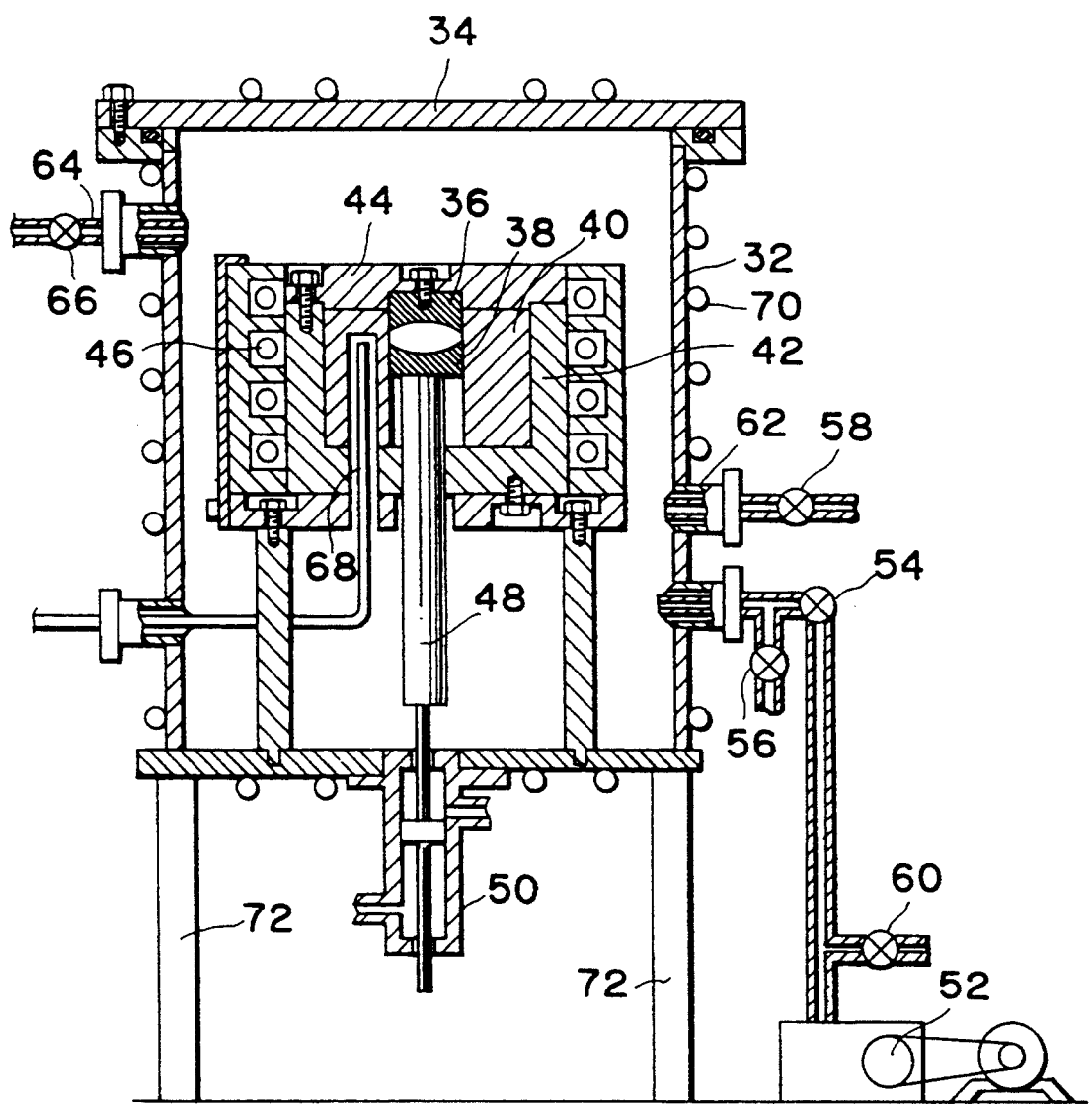
FIG. 3 is a cross-sectional view of a press molding apparatus.

FIG. 3 is a cross-sectional view showing an example of the apparatus for effecting the press molding, utilizing the glass blank prepared as explained above.

Referring to FIG. 3, there are shown a vacuum chamber 32; a lid 34 thereof; an upper mold 36, a lower mold 38 and a cylindrical mold 40 for the press molding of a lens; a mold holder 42; an upper mold support 44; a heater 46; a push-up rod 48 for pushing up the lower mold 38; a cylinder 50 for actuating the push-up rod 48; a vacuum pump 52; valves 54, 56, 58, 60; a pipe 62 for introducing nitrogen gas; a lead pipe 64; a valve 66; a temperature sensor 68; a cooling water pipe 70; and vacuum chamber support members 72.

The above-mentioned upper mold 36, lower mold 38 and cylindrical mold 40 can be composed, for example, of a base material such as a super hard alloy, Si$_3$N$_4$, SiC, cyalon, cermet, Al$_2$O$_3$, ZrO$_2$ or Cr$_2$O$_3$, on which a surface coating of Si$_3$N$_4$, TiN, TaN, BN, AlN, SiC, TaC, WC or a platinum alloy are formed, if necessary.

In the following discussion, there will be shown an example of press molding with the glass blank of the foregoing embodiment, employing the above-explained apparatus.

The upper and lower molds 36 and 38, respectively, were made of Si$_3$N$_4$, and the surfaces thereof for forming optically functional faces were finished to a precision within three Newton's rings and a center line average surface roughness of 0.02 μm or less. The glass blank was placed in the molds, then the interior of the vacuum chamber was evacuated to a pressure of $1\times10^{-2}$ Torr or less, and nitrogen gas was introduced thereinto. After heating to 575° C., the cylinder 50 was activated to effect the pressing with a pressure of 100 kg/cm$^2$ for 5 minutes. Subsequently, cooling was gradually conducted to 200° C., then air was introduced into the vacuum chamber, and the molded article was taken out by opening the mold.

One hundred lenses were molded in this manner. Observation of the functional faces of the obtained lenses with a scanning electron microscope of 5,000 magnifications revealed no surface defect, with no clouding or coloring on either face. There were also no observed fusions to the mold member or cracks. The lenses showed satisfactory surface precision on both lens faces.

As explained in the foregoing, the present invention is featured by forming, on the surface of the glass base, a layer in which water-soluble components are decreased, and a hydrocarbon coating layer thereon, thereby preventing the coloring of a molded article and the clouding thereof resulting from the components of the hydrocarbon coating layer. It is also rendered possible to prevent a reaction between the glass blank and the mold member and to lower the adhesive force therebetween, thereby preventing fusion and crack formation.

What is claimed is:

1. A method of manufacturing an optical element, including the performance of press-molding a glass blank, said method comprising the steps of:
    forming a water-soluble component-removed layer on a surface of the glass blank by immersing the glass blank in boiling water;
    forming a hydrocarbon coating layer on a surface of the water-soluble component-removed layer; and
    molding the optical element by pressing the glass blank with mold members after the water-soluble component-removed layer and the hydrocarbon coating layer are formed, wherein the mold members have a predetermined shape of the optical element.

2. A method according to claim 1, wherein the optical element comprises a lens.

* * * * *

UNITED STATES PATENT AND TRADEMARK OFFICE
CERTIFICATE OF CORRECTION

PATENT NO. : 5,340,373
DATED : August 23, 1994
INVENTOR(S) : Miyazaki

It is certified that error appears in the above-indentified patent and that said Letters Patent is hereby corrected as shown below: Title page,

[56] References Cited:

U.S. PATENT DOCUMENTS

Insert: --5,168,404 12/1992 Miyazaki et al. ... 359/718--.

Insert: --FOREIGN PATENT DOCUMENTS

| | | |
|---|---|---|
| 61-29890 | 7/1986 | Japan |
| 62-207728 | 9/1987 | Japan |
| 1-264937 | 10/1989 | Japan |
| 2-1778 | 1/1990 | Japan |
| 2-1779 | 1/1990 | Japan |
| 2-1780 | 1/1990 | Japan |
| 4-77322 | 3/1992 | Japan--. |

COLUMN 1:

Line 59, "stickes" should read --sticks--, and "with" should be deleted.

COLUMN 2:

Line 27, "boric," should read --boric--; and
Line 38, "the" should be deleted.

UNITED STATES PATENT AND TRADEMARK OFFICE
CERTIFICATE OF CORRECTION

PATENT NO. : 5,340,373
DATED : August 23, 1994
INVENTOR(S) : Miyazaki

It is certified that error appears in the above-indentified patent and that said Letters Patent is hereby corrected as shown below:

<u>COLUMN 4</u>:

Line 20, "following there," should read --following, there--.

Signed and Sealed this

Twelfth Day of March, 1996

Attest:

BRUCE LEHMAN

Attesting Officer

Commissioner of Patents and Trademarks